US012307841B2

(12) United States Patent
Verma et al.

(10) Patent No.: US 12,307,841 B2
(45) Date of Patent: *May 20, 2025

(54) SCHEDULED ACCESS CONTROL FOR AN ELECTRONIC LOCK

(71) Applicant: Apple Inc., Cupertino, CA (US)

(72) Inventors: Lochan Verma, Danville, CA (US); Arun Yadav, Cupertino, CA (US); Joachim S. Hammerschmidt, Mountain View, CA (US); Ayman F. Naguib, Cupertino, CA (US); Su Khiong Yong, Palo Alto, CA (US); Yann Ly-Gagnon, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/672,422

(22) Filed: May 23, 2024

(65) Prior Publication Data

US 2024/0420527 A1 Dec. 19, 2024

Related U.S. Application Data

(63) Continuation of application No. 17/660,629, filed on Apr. 25, 2022, now Pat. No. 11,995,929.

(Continued)

(51) Int. Cl.
*G07C 9/00* (2020.01)

(52) U.S. Cl.
CPC .................... *G07C 9/00309* (2013.01); *G07C 2009/00412* (2013.01); *G07C 2209/08* (2013.01); *G07C 2209/63* (2013.01)

(58) Field of Classification Search
CPC ...... G07C 9/00309; G07C 2009/00412; G07C 2209/08; G07C 2209/63; G07C 9/00174; H04W 4/80; H04W 12/069; H04W 12/50

(Continued)

(56) References Cited

U.S. PATENT DOCUMENTS 9,530,295 B2 12/2016 Johnson
9,788,351 B2 * 10/2017 Hariharan ............... H04W 4/80

(Continued)

FOREIGN PATENT DOCUMENTS

CN 103368722 A 10/2013
CN 103548060 A 1/2014
CN 106537466 A 3/2017

OTHER PUBLICATIONS

Chinese Patent Application No. 202210451570.7—First Office Action dated Dec. 31, 2024.

*Primary Examiner* — Nam V Nguyen
(74) *Attorney, Agent, or Firm* — DICKINSON WRIGHT RLLP

(57) ABSTRACT

Methods and apparatus to support scheduled access control for an electronic lock are described herein. An initiating central wireless device obtains an ephemeral identity resolving key (IRK) to use in resolving an ephemeral resolvable private address (RPA) of a peripheral wireless device. The initiating central wireless device can subsequently connect securely to the peripheral wireless device in order to unlock an electronic lock controlled by the peripheral wireless device to gain access during a scheduled time period. The ephemeral IRK and ephemeral RPA can be used for a limited period of time and/or for a predetermined number of usages during the scheduled time period.

20 Claims, 9 Drawing Sheets

Related U.S. Application Data

(60) Provisional application No. 63/180,593, filed on Apr. 27, 2021.

(58) Field of Classification Search
USPC .......................................... 340/5.72, 5.7, 5.8
See application file for complete search history.

(56) References Cited

U.S. PATENT DOCUMENTS

| | | | | |
|---|---|---|---|---|
| 9,792,747 | B2 | 10/2017 | Baumgarte et al. | |
| 10,297,094 | B2 | 5/2019 | Day et al. | |
| 10,475,264 | B2 | 11/2019 | Jin | |
| 10,657,744 | B2 * | 5/2020 | Ruggieri | G07C 9/00309 |
| 10,679,440 | B2 | 6/2020 | Einberg et al. | |
| 10,944,555 | B2 | 3/2021 | Young et al. | |
| 10,952,077 | B1 | 3/2021 | Holt et al. | |
| 11,115,811 | B2 * | 9/2021 | Batra | H04W 8/24 |
| 11,191,115 | B2 * | 11/2021 | Kwon | H04W 56/001 |
| 11,470,087 | B2 * | 10/2022 | Choi | H04W 12/08 |
| 11,995,929 | B2 * | 5/2024 | Verma | G07C 9/00309 |
| 2013/0259230 | A1 | 10/2013 | Polo et al. | |
| 2016/0248782 | A1 | 8/2016 | Troesch | |
| 2018/0262891 | A1 | 9/2018 | Wu et al. | |
| 2019/0312737 | A1 | 10/2019 | Mani et al. | |
| 2019/0356485 | A1 | 11/2019 | Young et al. | |
| 2022/0330029 | A1 | 10/2022 | Wang et al. | |
| 2022/0343705 | A1 | 10/2022 | Verma et al. | |
| 2023/0256780 | A1 | 8/2023 | Houston et al. | |

* cited by examiner

SCHEDULED ACCESS CONTROL FOR AN ELECTRONIC LOCK

CROSS-REFERENCE TO RELATED APPLICATIONS

The present application is a continuation of U.S. application Ser. No. 17/660,629, filed Apr. 25, 2022, entitled “SCHEDULED ACCESS CONTROL FOR AN ELECTRONIC LOCK,” issued May 28, 2024 as U.S. Pat. No. 11,995,929, which claims the benefit of U.S. Provisional Application No. 63/180,593, entitled “SCHEDULED ACCESS CONTROL FOR AN ELECTRONIC LOCK,” filed Apr. 27, 2021, the contents of all of which are incorporated by reference herein in their entirety for all purposes.

FIELD

The described embodiments relate generally to wireless communication, including methods and apparatus to support scheduled access control for an electronic lock. An initiating central wireless device can obtain an ephemeral identity resolving key (IRK) to use in resolving an ephemeral resolvable private address (RPA) of a peripheral wireless device. The initiating central wireless device can subsequently connect securely to the peripheral wireless device in order to unlock an electronic lock controlled by the peripheral wireless device to gain access, e.g., to an accessible location, during a scheduled time period.

BACKGROUND

Recent technological advances have integrated various wireless radio access technologies (RATs) into single, multi-functional wireless devices. Specialized single-function wireless devices are being replaced and/or supplemented by multi-functional wireless devices that can communicate using the various RATs. In addition, wireless communication capabilities are being integrated into a broad range of systems, including those that use traditional mechanical functions, such as access entry control for an accessible location or a vehicle. A user can pair a central wireless device, e.g., a smartphone, with a peripheral wireless device, e.g., an electronic lock, in order to control functions of the electronic lock, such as unlocking to grant access to a location and locking to restrict access to the location. The paired, central wireless device and electronic lock can allow for automatic unlocking and/or locking based on proximity of the paired, central wireless device to the electronic lock. Third-party services, such as delivery, cleaning, maintenance, or care-giving services, can be unable to access a location without knowledge of a secret key to resolve a private address of the electronic lock, where the private address changes over time to provide privacy protection.

SUMMARY

The described embodiments relate generally to wireless communication, including methods and apparatus to support scheduled access control for an electronic lock. An initiating central wireless device can obtain an ephemeral identity resolving key (IRK) to use in resolving an ephemeral resolvable private address (RPA) of a peripheral wireless device, the ephemeral RPA being based on the ephemeral IRK. The initiating central wireless device can subsequently connect securely to the peripheral wireless device in order to unlock an electronic lock controlled by the peripheral wireless device to gain access, e.g., to an accessible location, during a scheduled time period. In the description, the electronic lock can be any form of lock or access control (including electric, electronic, electro-mechanical, software-controlled, alarmed, etc.) imposed to limit or otherwise restrict/control access to a resource, e.g., to a location, area, device, goods, etc.

Methods, devices, and apparatus to schedule access control for an access control mechanism, e.g., an electronic lock, embedded in a peripheral wireless device to allow a central wireless device to be granted access controlled by the peripheral wireless device are described herein. The access control mechanism can be installed in an access entry port, e.g., a door, of an accessible location, e.g., a room, a home, a garage, a storage locker, or the like. A user, during and/or after installation of the access control mechanism, can pair a user’s central wireless device with the peripheral wireless device, e.g., based on a Bluetooth Low Energy (BLE) pairing process, to allow for engaging the access control mechanism (e.g., locking the lock) and disengaging the access control mechanism (e.g., unlocking the lock). The BLE pairing process can include establishment of a static shared secret key, e.g., an identity resolving key (IRK) and an exchange of authentication keys between the central wireless device and the peripheral wireless device to allow for proximity-based automatic control of the access control mechanism. Separate from the static IRK, the peripheral wireless device obtains an ephemeral IRK that can be used during a designated scheduled time period by one or more designated third parties. The ephemeral IRK can be generated by the peripheral wireless device or provided to the peripheral wireless device by and external entity. The ephemeral IRK can be provided to a central wireless device to be used by a service representative of a scheduled service that seeks to obtain access, e.g., to an accessible location, during the scheduled time period. The ephemeral IRK can be valid during the scheduled time period and may be invalid before and/or after the scheduled time period. The peripheral wireless device broadcasts an advertising packet that includes an ephemeral resolvable private address (RPA) that is based on the ephemeral IRK during the scheduled time period. The service representative’s central wireless device can resolve the ephemeral RPA based on knowledge of the ephemeral IRK. The service representative’s central wireless device can subsequently establish a secure BLE connection with the peripheral wireless device. In some embodiments, the central wireless device and the peripheral wireless device can perform a secure ranging setup to allow for secure proximity detection between the service representative’s central wireless device and the peripheral wireless device. The peripheral wireless device can grant access, e.g., by disengaging the access control mechanism of the access entry port, in response to a request from the service representative’s central wireless device after successful establishment of a secure BLE connection and/or based on a determination of proximity of the service representative’s central wireless device to the peripheral wireless device after establishing the secure BLE connection. In some embodiments, the ephemeral IRK and associated ephemeral RPA are valid only for a limited time period, e.g., during the scheduled time period but not before or after the scheduled time period. In some embodiments, the ephemeral IRK and associated ephemeral RPA are valid only for a limited number of secure BLE connections established during the scheduled time period. In some embodiments, the ephemeral IRK and associated ephemeral RPA are valid only for a limited number of access control mechanism disengagements during the scheduled time period. In some embodiments, the peripheral wireless device generates the ephemeral IRK and provides the ephemeral IRK securely to the service representative's central wireless device, e.g., via a secure Internet Protocol (IP) connection to a network-based server associated with the service representative's central wireless device. In some embodiments, the network-based server associated with the service representative's central wireless device generates the ephemeral IRK and provides the ephemeral IRK to the service representative's central wireless device and to the peripheral wireless device. In some embodiments, an ephemeral IRK is provided to multiple central wireless devices used by different service representatives, e.g., that are associated with a common service for which access is sought during the scheduled time period or that are associated with distinct services each of which seeks access during the scheduled time period (or during non-overlapping or partially overlapping scheduled time periods). In some embodiments, distinct ephemeral IRKs are provided to different central wireless devices used by the same or by distinct services, and the peripheral wireless device broadcasts distinct advertising packets that include ephemeral RPAs based on respective ephemeral IRKs during respective scheduled time periods associated with each of the distinct ephemeral IRKs.

Other aspects and advantages of the present disclosure will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
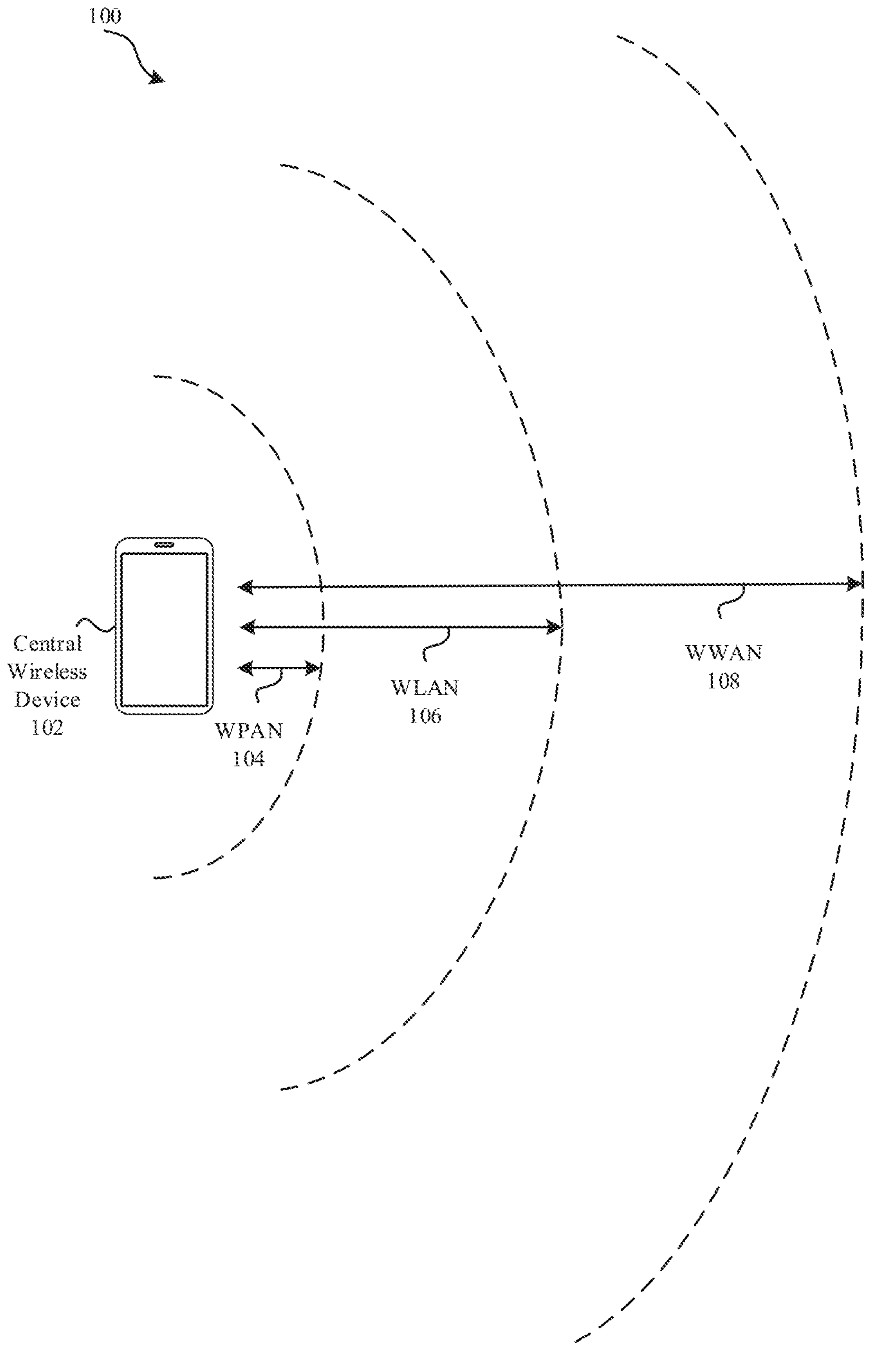
FIG. 1 illustrates an exemplary central wireless device configurable to communicate with a variety of radio access technologies, in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments relate generally to wireless communication, including methods and apparatus to support scheduled access control for an access entry mechanism, e.g., an electronic lock. An initiating central wireless device can obtain an ephemeral identity resolving key (IRK) to use in resolving an ephemeral resolvable private address (RPA) of a peripheral wireless device. The initiating central wireless device can subsequently connect securely to the peripheral wireless device in order to unlock an electronic lock controlled by the peripheral wireless device to gain access, e.g., to an accessible location, during a scheduled time period.

Methods, devices, and apparatus to schedule access control for an access control mechanism, e.g., an electronic lock, embedded in a peripheral wireless device to allow a central wireless device to be granted access controlled by the peripheral wireless device are described herein. The access control mechanism can be installed in an access entry port, e.g., a door, of the accessible location, e.g., a room, a home, a garage, a storage locker, or the like. A user, during and/or after installation of the access control mechanism that includes the peripheral wireless device embedded therein, can pair a user's central wireless device with the peripheral wireless device, e.g., based on a Bluetooth Low Energy (BLE) pairing process. After completion of the BLE pairing process, the user's central wireless device can be allowed to engage the access control mechanism (e.g., by locking the lock) and to disengage the access control mechanism (e.g., by unlocking the lock). The BLE pairing process can include establishment of a static secret key, e.g., an identity resolving key (IRK), shared between the user's central wireless device and the peripheral wireless device of the access control mechanism. The BLE pairing process can further include an exchange of authentication keys between the user's central wireless device and the peripheral wireless device to allow for proximity-based automatic control (e.g., locking and unlocking) of the access control mechanism.

The user can also seek to share access managed by the access control mechanism of the peripheral wireless device with one or more third parties, e.g., with a service representative of a scheduled service that seeks access during a scheduled time period. The user will not share the static IRK with the scheduled service in order to maintain control of access based on the static IRK. Instead, the user obtains and makes use of an ephemeral (temporary) IRK to be used by one or more third parties designated by the user during the scheduled time period. The peripheral wireless device obtains the ephemeral IRK that can be used during a designated scheduled time period by generating the ephemeral IRK or receiving the ephemeral IRK from another device via a secure communication channel. The ephemeral IRK can be provided to a central wireless device of a service representative for a scheduled service that seeks to obtain access, e.g., to an accessible location, during the scheduled time period. In some embodiments, the peripheral wireless device generates the ephemeral IRK and provides the ephemeral IRK securely to the service representative's central wireless device, e.g., via a secure Internet Protocol (IP) connection to a network-based server associated with the service representative's central wireless device. In some embodiments, the network-based server associated with the service representative's central wireless device generates the ephemeral IRK and provides the ephemeral IRK to the service representative's central wireless device and to the peripheral wireless device. In some embodiments, a third device, e.g., the user's central wireless device, generates the ephemeral IRK and provides the ephemeral IRK to the service representative's central wireless device and to the peripheral wireless device. The ephemeral IRK can be generated and/or provided in advance of the scheduled time period and/or during the scheduled time period in various embodiments. The scheduled time period may be adjusted in some embodiments. The ephemeral IRK can be valid during the scheduled time period.

The peripheral wireless device can broadcast one or more advertising packets that include an ephemeral resolvable private address (RPA) that is based on the ephemeral IRK during the scheduled time period. The peripheral wireless device can also broadcast one or more advertising packets that include a separate RPA based on the static IRK during the scheduled time period. The service representative's central wireless device cannot resolve the separate RPA based on the static IRK, as the representative's central wireless device lacks knowledge of the static IRK. The service representative's central wireless device can resolve the ephemeral RPA based on knowledge of the ephemeral IRK. The service representative's central wireless device can subsequently establish a secure BLE connection with the peripheral wireless device based on resolution of the ephemeral RPA. In some embodiments, the central wireless device and the peripheral wireless device can perform a secure ranging setup to allow for secure proximity detection between the service representative's central wireless device and the peripheral wireless device. The peripheral wireless device can grant access, e.g., by disengaging the access control mechanism of the access entry port, in response to a request from the service representative's central wireless device after successful establishment of a secure BLE connection and/or based on a determination of proximity of the service representative's central wireless device to the peripheral wireless device after the establishing the secure BLE connection.

In some embodiments, the ephemeral IRK and associated ephemeral RPA are valid only for a limited time period, e.g., during the scheduled time period but not before or after the scheduled time period. In some embodiments, the ephemeral IRK and associated ephemeral RPA are valid only for a limited number of secure BLE connections during the scheduled time period. In some embodiments, the ephemeral IRK and associated ephemeral RPA are valid only for a limited number of access control mechanism disengagements during the scheduled time period. In some embodiments, the ephemeral IRK becomes invalid the peripheral wireless device grants access. In some embodiments, before and/or during the scheduled time period, the service representative's central wireless device obtains an updated ephemeral IRK and replaces the ephemeral key with the updated ephemeral IRK before resolving the ephemeral RPA broadcast by the peripheral wireless device.

In some embodiments, an ephemeral IRK is provided to multiple central wireless devices, which can be used by different service representatives that can be associated with a common service for which access is sought during the scheduled time period, or which can be associated with distinct services each of which seeks access during one or more scheduled time periods. In some embodiments, the same ephemeral IRK is provided to multiple central wireless devices used by different service representatives during different scheduled time periods, which can be non-overlapping or overlapping in time. During respective scheduled time periods, the peripheral wireless device broadcasts ephemeral RPAs based on the ephemeral IRKs associated with their respective scheduled time periods. The peripheral wireless device can broadcast advertising packets that cycle through multiple ephemeral RPAs associated with multiple ephemeral IRKs to allow a service representative's central wireless device to receive an advertising packet that includes an ephemeral RPA associated with the ephemeral IRK that was previously provided to the service representative's central wireless device. In some embodiments, distinct ephemeral IRKs are provided to different central wireless devices used by the same service or used by distinct services, and the peripheral wireless device broadcasts advertising packets that include ephemeral RPAs based on the ephemeral IRKs during respective scheduled time periods associated with each of the distinct ephemeral IRKs. In some embodiments, each of the distinct ephemeral IRKs are valid for the same scheduled time period, while in other embodiments, each of the distinct ephemeral IRKs are valid for different, possibly overlapping, scheduled time periods. In some embodiments, use of the same ephemeral IRK or of distinct ephemeral IRKs can depend on the services that are scheduled to obtain access. In some embodiments, use of the same ephemeral IRK or of distinct ephemeral IRKs depends on a battery level of the access control mechanism. In some embodiments, the peripheral wireless device broadcasts fewer distinct ephemeral RPAs based on distinct ephemeral IRKs (including possibly a single ephemeral RPA based on a single ephemeral IRK) for lower battery levels (e.g., below a predetermined power threshold level) during one or more scheduled time periods. For example, the peripheral wireless device can provide a single ephemeral IRK to one or more services when the battery level of the peripheral wireless device is below the predetermined power threshold level and broadcast advertising packets that include a single ephemeral RPA based on the single ephemeral IRK during scheduled timed periods for each of the one or more services. This scenario allows for fewer distinct advertising packets to be broadcast during the scheduled time period, which can conserve battery power of the peripheral wireless device. In some embodiments, the peripheral wireless device is configured to allow for broadcasting a greater number of distinct ephemeral RPAs based on distinct ephemeral IRKs for higher battery levels (e.g., above a predetermined power threshold level) during one or more scheduled time periods. This scenario allows for greater privacy and security as each service is associated with a distinct, limited-use ephemeral IRK during the scheduled time period.

These and other embodiments are discussed below with reference to FIGS. 1-7; however, those skilled in the art will readily appreciate that the detailed description given herein with respect to these figures is for explanatory purposes only and should not be construed as limiting.

FIG. 1 illustrates a diagram 100 of an exemplary set of overlapping wireless networks for a wireless device 102. The wireless device 102 can include a combination of hardware and software to provide wireless connections using one or more different wireless networks alone, separately, or in combination, such as via the set of overlapping networks. The wireless device 102 can represent a device having wireless communications capabilities, such as a smart phone (e.g., an iPhone®), a tablet device (e.g., an iPad®), a wearable computing device (e.g., an Apple Watch™), a portable media player (e.g., an iPod®), a laptop computer (e.g., a MacBook®), a desktop computer (e.g., an iMac®), a digital media server/extender (e.g., an Apple TV®), among other possible devices.

The wireless device 102 can include a combination of hardware, software, and/or firmware to provide communication using a wireless personal area network (WPAN) 104, which can provide power efficient connections while operating over a limited distance. WPAN 104 connections can typically provide for connecting the wireless device 102 to peripheral and associated wireless devices, such as headsets, earpieces, supplemental display devices, and supplemental input/output devices, for example. A representative WPAN 104 can operate in accordance with a communication protocol specified by the Bluetooth Special Interest Group (SIG) standards organization, for example Bluetooth® Classic and/or Bluetooth Low Energy (BLE), and/or by Apple Inc. such as an Apple Wireless Direct Link (AWDL).

The wireless device 102 can also include a combination of hardware, software, and/or firmware to provide communication using a WLAN 106 that can provide a higher data rate and a greater operating range than a WPAN 104. The wireless device 102 can include separate and/or shared hardware, software, and/or firmware elements for the WPAN 104 and the WLAN 106. Both the WPAN 104 and WLAN 106 can operate as "local" wireless networks. A representative WLAN 106 can operate in accordance with a communication protocol specified by the Institute of Electrical and Electronic Engineers (IEEE) standards organization, such as the IEEE 802.11 family of wireless standards, which in some versions can also be referred to as Wi-Fi®.

The wireless device 102 can also include additional hardware, software, and/or firmware to provide a wireless wide area network (WWAN) 108 capability, such as to interconnect with one or more cellular wireless networks. The wireless device 102 can provide a multitude of services using one or more connections through its wireless networking capabilities.

Figure 2:
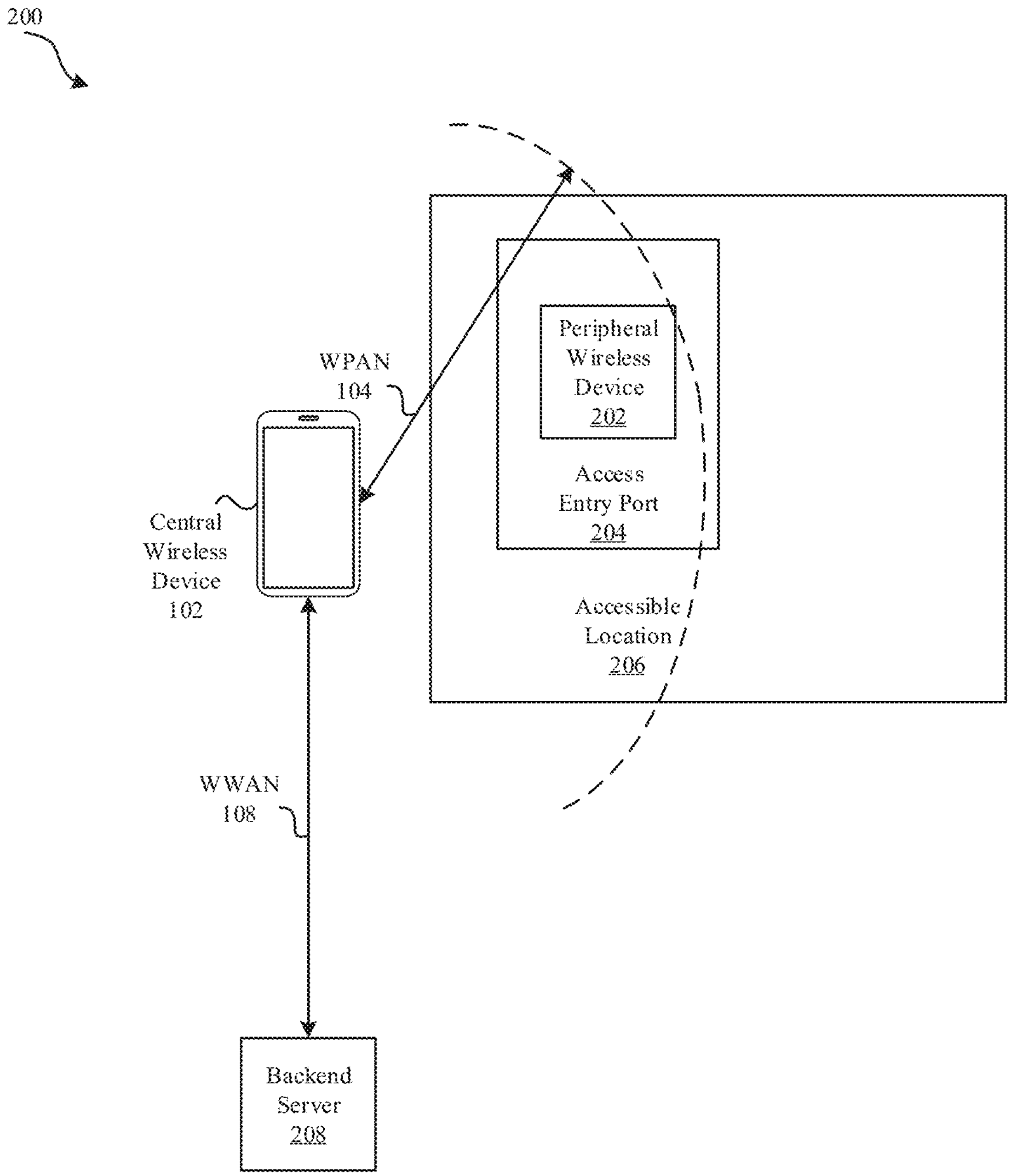
FIG. 2 illustrates an exemplary wireless personal area network (WPAN) system including a central wireless device and a peripheral wireless device housed in an access entry port of an accessible location, in accordance with some embodiments.

FIG. 2 illustrates a diagram 200 of an exemplary WPAN 104 system that includes a central wireless device 102 that can communicate with a peripheral wireless device 202 housed in an access entry port 204 of an accessible location 206. The central wireless device 102 can also be referred to as a wireless device, a first wireless device, a requesting wireless device, an initiating wireless device, or the like. The peripheral wireless device 202 can also be referred to as a wireless device, a second wireless device, another wireless device, a responding wireless device, or the like. The central wireless device 102 and the peripheral wireless device 202 can establish a secure connection via the WPAN 104, e.g., after a successful Bluetooth low energy (BLE) pairing process. The peripheral wireless device 202 can control an access control mechanism, e.g., an electronic lock, for an access entry port 204, e.g., a door, that allows access to an accessible location 206, e.g., a room, a home, a garage, a storage locker, or the like. Access can be permitted when the central wireless device 102 is within proximity of the peripheral wireless device 202 and can successfully resolve a resolvable private address (RPA) included in an advertising packet broadcast by the peripheral wireless device 202. A user of the peripheral wireless device 202 that controls access to the accessible location 206 can pair their own central wireless device 102 with the peripheral wireless device 202 and established a shared secret key, e.g., a static identity resolving key (IRK) as well as exchange cryptographic keys used for authentication and/or secure connection establishment. The peripheral wireless device 202 can broadcast an RPA based on the static IRK, and the central wireless device 102 can resolve the RPA using the static IRK shared by the peripheral wireless device 202. The user's central wireless device 102 can recognize the peripheral wireless device 202 without requiring an additional BLE pairing process. BLE supports a privacy feature that reduces device identity tracking over a period of time by changing the RPA frequently. The RPA can be based on the static IRK known to the central wireless device 102 from the previous BLE pairing, and the peripheral wireless device 202 can grant access to the accessible location 206 via the access entry port 204 based on proximity of the user's central wireless device 102 to the peripheral wireless device 202.

For a different central wireless device 102 that is not owned by the user associated with the peripheral wireless device 202, e.g., a service representative's central wireless device 102 for a scheduled service, the user can refrain from sharing the static IRK to maintain secrecy of the static IRK. Instead, as discussed further herein, the peripheral wireless device 202 can share an ephemeral (temporary) IRK with the service representative's central wireless device 102 via a secure out-of-band communication, i.e., via a different communication than via the WPAN 104. For example, the peripheral wireless device 202 can provide the ephemeral IRK via a secure Internet Protocol (IP) communication (not shown) to a backend server 208 associated with the scheduled service. The service representative's central wireless device 102 can obtain the shared ephemeral IRK from the backend server 208, e.g., via a WWAN 108, via a WLAN 106, or via another secure communication link (not shown).

Figure 3:
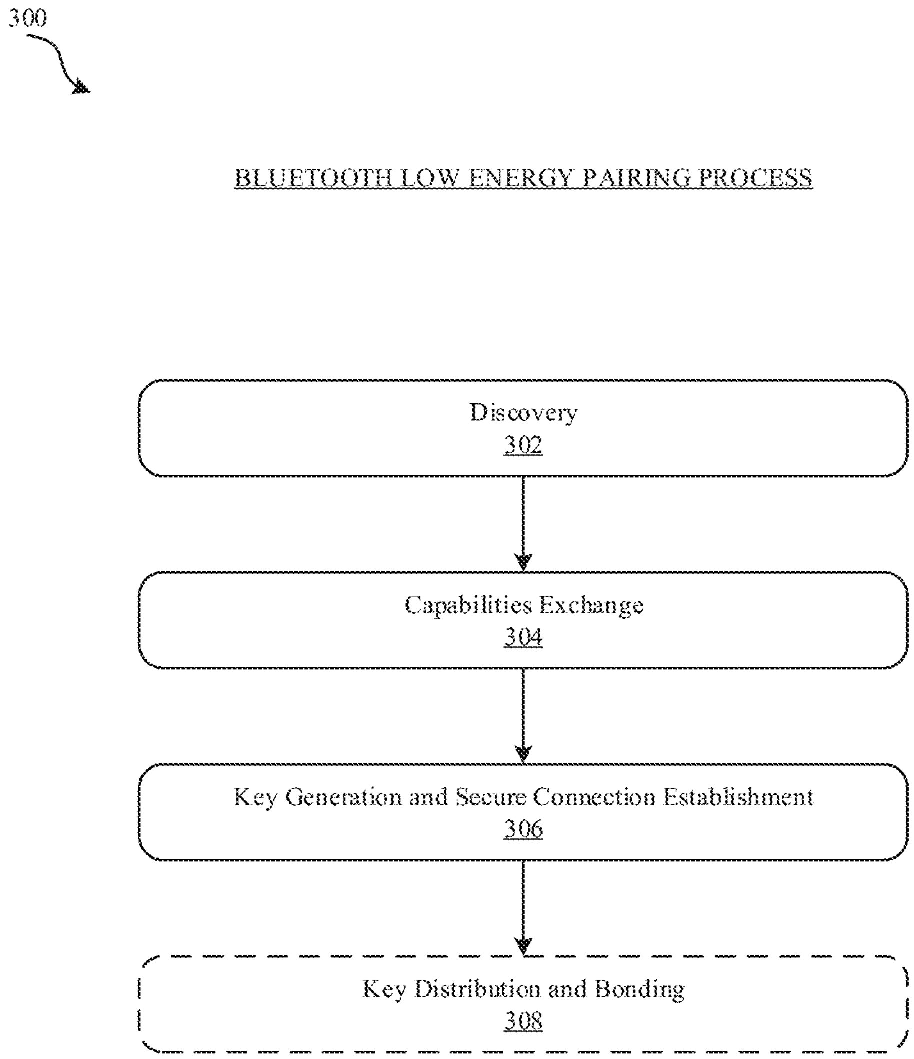
FIG. 3 illustrates an example of a Bluetooth Low Energy (BLE) pairing process, in accordance with some embodiments.

FIG. 3 illustrates a diagram 300 of phases of an exemplary Bluetooth Low Energy (BLE) pairing process between two wireless devices, e.g., between a central wireless device 102 and a peripheral wireless device 202. During a discovery 302 phase of the BLE pairing process, the central wireless device 102 and the peripheral wireless device 202 discover each other's presence based on transmission and reception of advertising packets broadcast by the respective wireless devices. During a capabilities exchange 304 phase, the central wireless device 102 and the peripheral wireless device 202 communicate capabilities information regarding their respective devices' capabilities and preferences for communication. During a key generation and secure connection establishment 306 phase, the central wireless device 102 and the peripheral wireless device 202 generate cryptographic keys used for establishing secure connections and authentication purposes. During an optional key distribution and bonding 308 phase, the central wireless device 102 and the peripheral wireless device 202 can exchange cryptographic keys used for long term automatic connection establishment.

Figure 4:
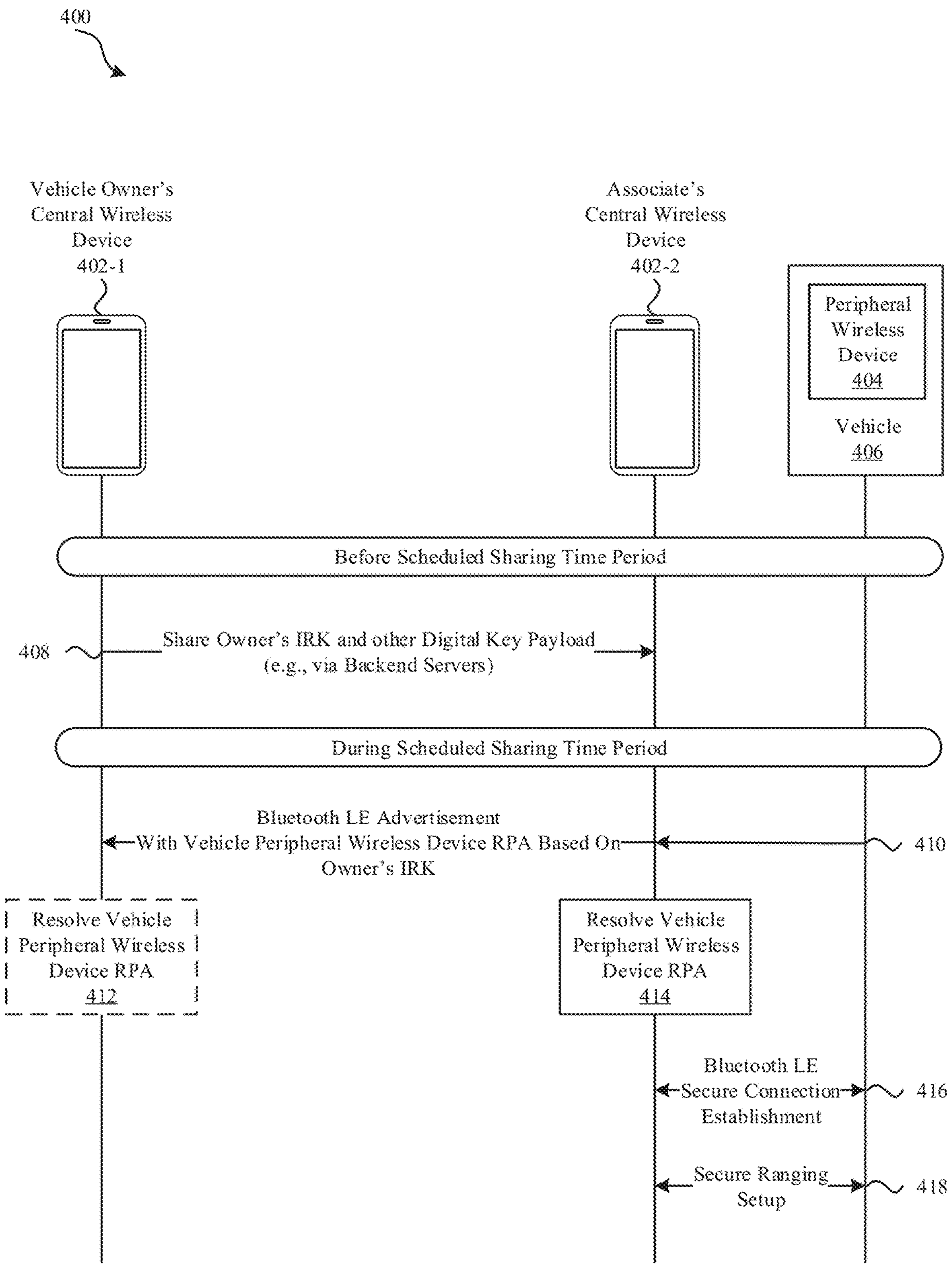
FIG. 4 illustrates an exemplary sequence of messages for establishing a secure BLE connection between a central wireless device and a peripheral wireless device to allow access to a vehicle using an owner's static identity resolving key (IRK), in accordance with some embodiments.

FIG. 4 illustrates a diagram 400 of an exemplary secure Bluetooth Low Energy (BLE) connection process that uses a vehicle owner's static IRK to allow access by an associate of the vehicle owner to a vehicle 406 during a scheduled time period. Prior to the scheduled time period, at 408, a vehicle owner's central wireless device 402-1 can share a static IRK and other digital key payload information with an associate's central wireless device 402-2, e.g., to allow access to the vehicle by the associate of the vehicle owner during the scheduled time period. The vehicle owner's central wireless device 402-1 can share the static IRK and other digital key payload information with the associate's central wireless device 402-2, at 408, via a secure connection to one or more network-based backend servers. During the scheduled time period, at 410, the peripheral wireless device 404 of the vehicle 406 can transmit a Bluetooth Low Energy (BLE) advertising packet that includes a resolvable private address (RPA) of the peripheral wireless device 404 of the vehicle 406, the RPA based on the vehicle owner's static IRK previously shared with the associate's central wireless device 402-2. The static IRK can be used by the associate's central wireless device 402-2 to resolve a resolvable private address (RPA) included in one or more advertising packets broadcast by the peripheral wireless device 404 of the vehicle 406 during a BLE discovery 302 phase. Both the vehicle owner's central wireless device 402-1 and the associate's central wireless device 402-2, having knowledge of the static IRK, can resolve the RPA in the Bluetooth LE advertising packet, e.g., at 412 for the vehicle owner's central wireless device 402-1, or at 414, for the associate's central wireless device 402-2. The Bluetooth address of the peripheral wireless device 404 derived from the RPA can be used by the associate's central wireless device 402-2 to establish a Bluetooth connection with the peripheral wireless device 404 at 416 during the scheduled time period. The associate's central wireless device 402-2 can subsequently perform a secure ranging setup process at 418 to allow for proximity detection, e.g., distance and angle of arrival, between the associate's central wireless device 402-2 and the peripheral wireless device 404. When the peripheral wireless device 404 is included in a digital key lock mechanism of the vehicle 406, after the secure ranging setup at 418 and BLE secure connection establishment at 416, the associate's central wireless device 402-2 can communicate with the peripheral wireless device 404 to cause a lock of the vehicle 406 to be disengaged in order to provide access to the vehicle 406. The process illustrated in FIG. 4, however, can be subject to privacy and security issues, such as performed by malicious third-party scanning devices to gain and/or use knowledge of the vehicle owner's static IRK. As such, the use of a static IRK to provide access during a scheduled time period is not preferred, and instead an ephemeral IRK will be used as discussed further herein.

Figure 5A:
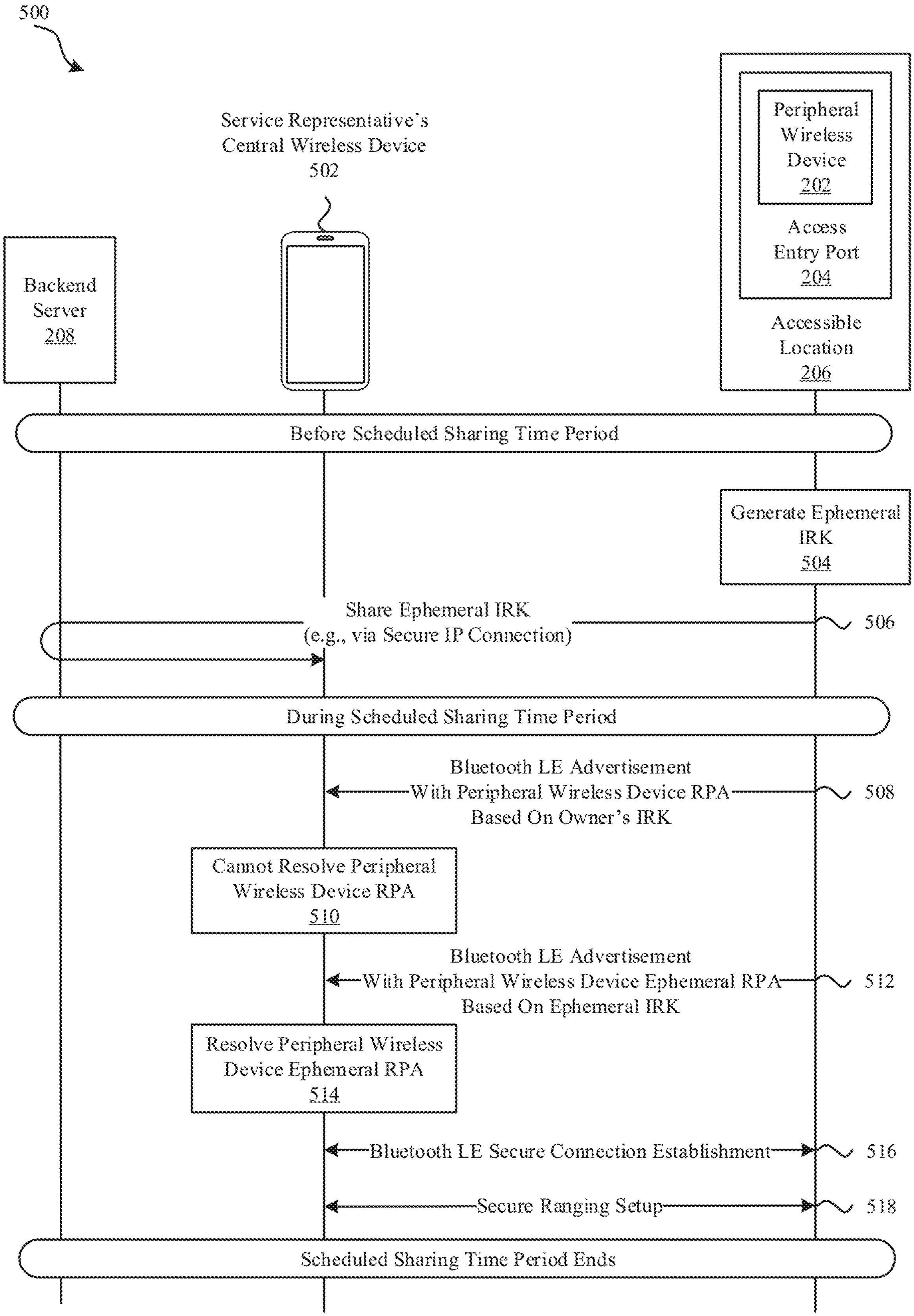
FIGS. 5A, 5B, and 5C illustrate exemplary sequences of messages for establishing secure BLE connections between a central wireless device and a peripheral wireless device to grant access based on an ephemeral IRK, in accordance with some embodiments.

FIG. 5A illustrates a diagram 500 of an exemplary sequence of messages for establishing secure BLE connections between a service representative's central wireless device 502 and a peripheral wireless device 202 to grant access to an accessible location 206 during a scheduled time period based on use of an ephemeral IRK. The peripheral device 202 can be included in an access entry port 204, e.g., a door, of an accessible location 206, e.g., a room, a home, a garage, a storage locker, or the like. The peripheral wireless device 202 can schedule access control for an access control mechanism, e.g., an electronic lock, embedded in the peripheral wireless device 202 to allow a service representative's central wireless device 502 to be granted access to the accessible location 206 controlled by the peripheral wireless device 202. Before a scheduled sharing time period during which access can be granted, the peripheral wireless device 202, at 504, can generate an ephemeral IRK. At 506, the peripheral wireless device 202 can share the ephemeral IRK with the service representative's central wireless device 502 via a network-based backend server 208. In some embodiments, the peripheral wireless device 202 communicates the ephemeral IRK to the backend server 208 via a secure Internet Protocol (IP) connection. In some embodiments, the peripheral wireless device 202 shares the ephemeral IRK with a separate device (not shown), e.g., an owner's central wireless device or an Internet connected device, such as an access point, with which the peripheral wireless device 202 can communicate, in order to have the separate device forward the ephemeral IRK to the network-based backend server 208. In some embodiments, the network-based backend server 208 is managed by a service with which the service representative's central wireless device 502 is associated and for which a user/owner of the accessible location 206 (and the peripheral wireless device 202) can seek to allow a service representative to be granted access to the accessible location 206 during the scheduled sharing time period.

During the scheduled time period, at 508, the peripheral wireless device 202 can broadcast a Bluetooth Low Energy (BLE) advertisement (advertising packet) that includes a resolvable private address (RPA) of the peripheral wireless device 202 based on a static IRK maintained by an owner of the peripheral wireless device 202. At 510, the service representative's central wireless device 502 can be unable to resolve the RPA based on the owner's static IRK, as the service representative's central wireless device 502 has no knowledge of the owner's static IRK. This contrasts with the process illustrated in FIG. 4, in which the associate's central wireless device 402-2 has knowledge of the static IRK. At 512, the peripheral wireless device 202 can broadcast a different BLE advertisement that includes an ephemeral RPA of the peripheral wireless device 202 based on the ephemeral IRK previously provided via a secure out-of-band connection before the scheduled sharing time period. As shown in FIG. 5A, the peripheral wireless device 202 can broadcast different advertisement messages that include different RPAs at different times during the scheduled sharing time period. At 514, the service representative's central wireless device 502 can resolve the ephemeral RPA of the peripheral wireless device 202 based on previously obtained knowledge of the ephemeral IRK. After the address resolution, the service representative's central wireless device 502, at 516, can establish a secure BLE connection with the peripheral wireless device 202. At 518, the service representative's central wireless device can perform a secure ranging setup process to allow for proximity detection between the service representative's central wireless device 502 and the peripheral wireless device 202, e.g., allowing for distance and/or angle-of-arrival measurements between the service representative's central wireless device 502 and the peripheral wireless device 202. As a result of the successful ephemeral RPA resolution and the subsequent secure BLE connection establishment and secure ranging setup, the peripheral wireless device 202 may grant access to the accessible location 206 via the access entry port 204, such as based on a request for access from the service representative's central wireless device 502 and/or automatically based on proximity detection.

The process illustrated in FIG. 5A can provide for protection against privacy and security attacks by unknown, malicious third-party scanning devices as the ephemeral IRK can be limited to use during the scheduled time period and/or for a limited number of access grants by the peripheral wireless device 202. The owner's static IRK remains secret and is not shared with the service representative's central wireless device 502. The peripheral wireless device 202 can restrict BLE advertisement messages that include the ephemeral RPA based on the ephemeral IRK to only occur during the scheduled sharing time period and to not occur before or after the scheduled sharing time period. In some embodiments, the peripheral wireless device 202 stops sending BLE advertisement messages that include the ephemeral RPA after successful resolution of the ephemeral RPA by the service representative's central wireless device 502. In some embodiments, the peripheral wireless device 202 stops sending BLE advertisement messages that include the ephemeral RPA after successfully establishing a secure BLE connection with the service representative's central wireless device 502. In some embodiments, the peripheral wireless device 202 stops sending BLE advertisement messages that include the ephemeral RPA after successful secure BLE connection establishment with the service representative's central wireless device 502. In some embodiments, the peripheral wireless device 202 stops sending BLE advertisement messages that include the ephemeral RPA after secure ranging setup with the service representative's central wireless device 502. In some embodiments, the peripheral wireless device 202 stops sending BLE advertisement messages that include the ephemeral RPA after granting access via the access entry port 204 to the service representative's central wireless device 502.

In some embodiments, the ephemeral IRK is provided to multiple different service representatives' central wireless devices used by different services for which the owner of the accessible location 206 seeks to grant access, e.g., to each of the different services, where each has a separate scheduled sharing time period that can be distinct, identical, or overlapping in time. In some embodiments, distinct ephemeral IRKs are provided to different services for granting access. In some embodiments, the peripheral wireless device 202 broadcasts different BLE advertisement messages that use different ephemeral IRKs to grant access to distinct service representatives' central wireless devices 502, which can occur during a common or overlapping schedule time period or during distinct scheduled time periods. In some embodiments, the peripheral wireless device 202 can use a common ephemeral IRK for distinct services based on a configuration or preference to conserve battery power level of the peripheral wireless device 202, e.g., when the peripheral wireless device 202 is operating below a predetermined threshold battery power level. Broadcasting fewer advertising packets that use different RPAs based on different IRKs (static and ephemeral) can conserve battery power for the peripheral wireless device 202. In some embodiments, the peripheral wireless device 202 can allow for use of distinct ephemeral IRKs for distinct services based on a battery power level of the peripheral wireless device 202, e.g., when the peripheral wireless device 202 is operating above a predetermined threshold battery power level. Broadcasting a greater number of advertising packets that use different RPAs based on different IRKs (static and ephemeral) can require more power for the peripheral wireless device 202 but can also increase security and privacy, as each service can be provided a distinct, identifiable, limited-use ephemeral IRK.

In some embodiments, the peripheral wireless device 202 restricts BLE connection establishment and/or access grants for a particular ephemeral IRK to a predetermined number of uses, e.g., one-time use only during the scheduled time period. In some embodiments, the peripheral wireless device 202 allows for multiple, distinct BLE connection establishments and/or access grants based on a particular ephemeral IRK during the scheduled sharing time period, e.g., to allow the service representative's central wireless device 502 to obtain access more than once during the scheduled sharing time period. In some embodiments, the ephemeral IRK is provided to the service representative's central wireless device during the scheduled time period rather than in advance of the scheduled time period. In some embodiments, the peripheral wireless device 202 updates the ephemeral IRK, e.g., by providing an updated ephemeral IRK to the service representative's central wireless device 502 before and/or during the scheduled time period, in which case the previously provided ephemeral IRK will not be used after the updated ephemeral IRK is sent. In some embodiments, the peripheral wireless device 202 provides the ephemeral IRK to the backend server 208 in advance of the scheduled sharing time period, but the backend server 208 only provides the ephemeral IRK to the service representative's central wireless device 502 during the scheduled time period.

Figure 5B:
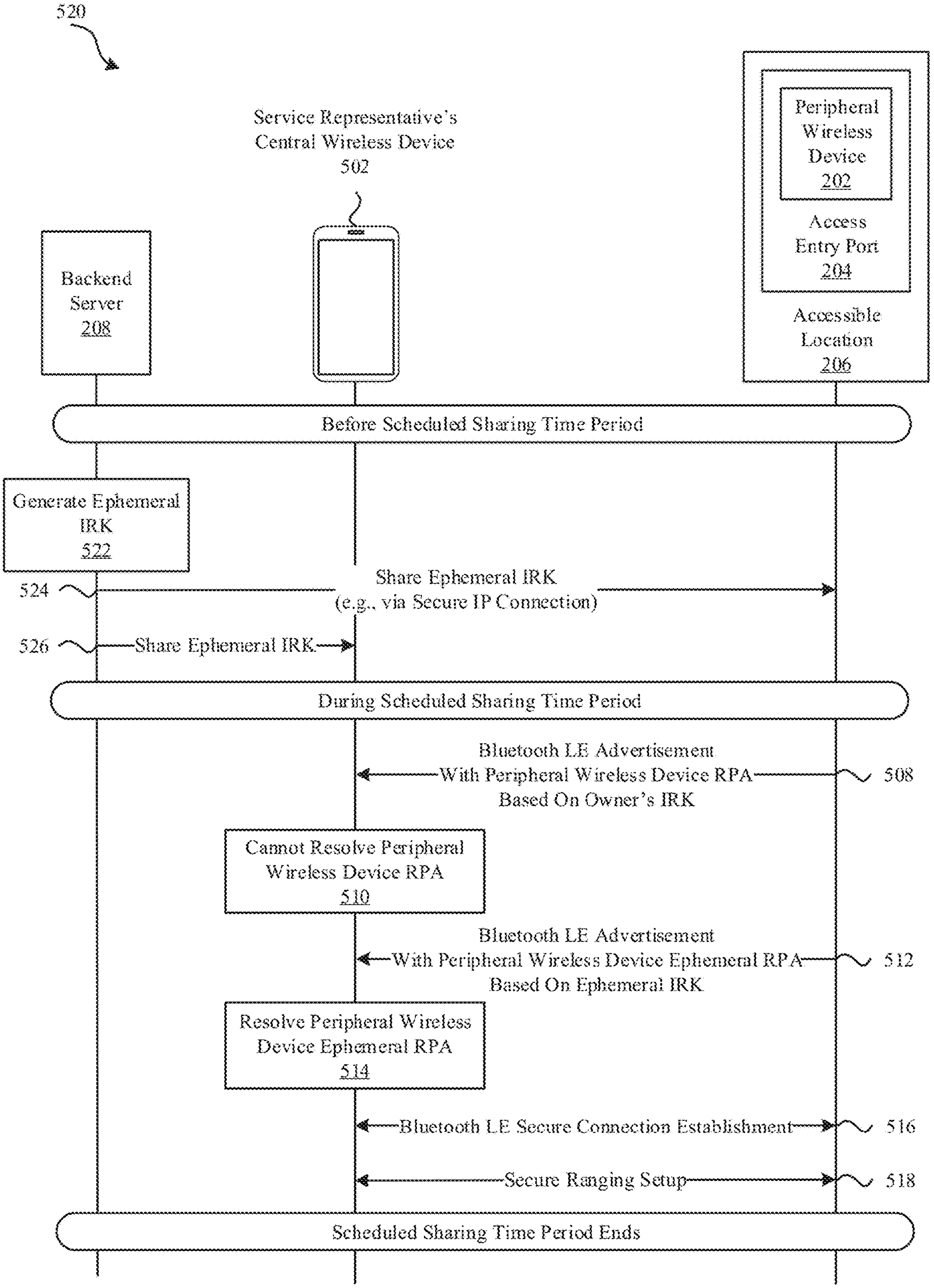

FIG. 5B illustrates a diagram 520 of another exemplary sequences of messages for establishing a secure BLE connection between a service representative's central wireless device 502 and a peripheral wireless device 202 to grant access, e.g., to an accessible location 206, during a scheduled time period based on use of an ephemeral IRK. Before the scheduled sharing time period during which access can be granted, at 522, a backend server associated with a service for which access is sought to be granted can generate an ephemeral IRK. The backend server 208, at 524, can share the ephemeral IRK with the peripheral wireless device 202, e.g., via a secure IP connection. At 526, the backend server 208 can further share the ephemeral IRK 522 with the service representative's central wireless device 502 for use during the scheduled time period. In some embodiments, the backend server 208 provides the ephemeral IRK to the peripheral wireless device 202 and/or to the service representative's central wireless device 502 during the scheduled time period rather than before the scheduled time period. During the scheduled time period, the peripheral wireless device broadcasts one or more BLE advertisement messages that include an ephemeral RPA for the peripheral wireless device based on the ephemeral IRK provided by the backend server 208. As with FIG. 5A, the service representative's central wireless device 502 can resolve the ephemeral RPA, establish a BLE connection, and complete a secure ranging operation to allow for obtaining access, e.g., to the accessible location 206, during the scheduled sharing time period. The actions involved and optional variations described for FIG. 5A also apply to FIG. 5B.

Figure 5C:
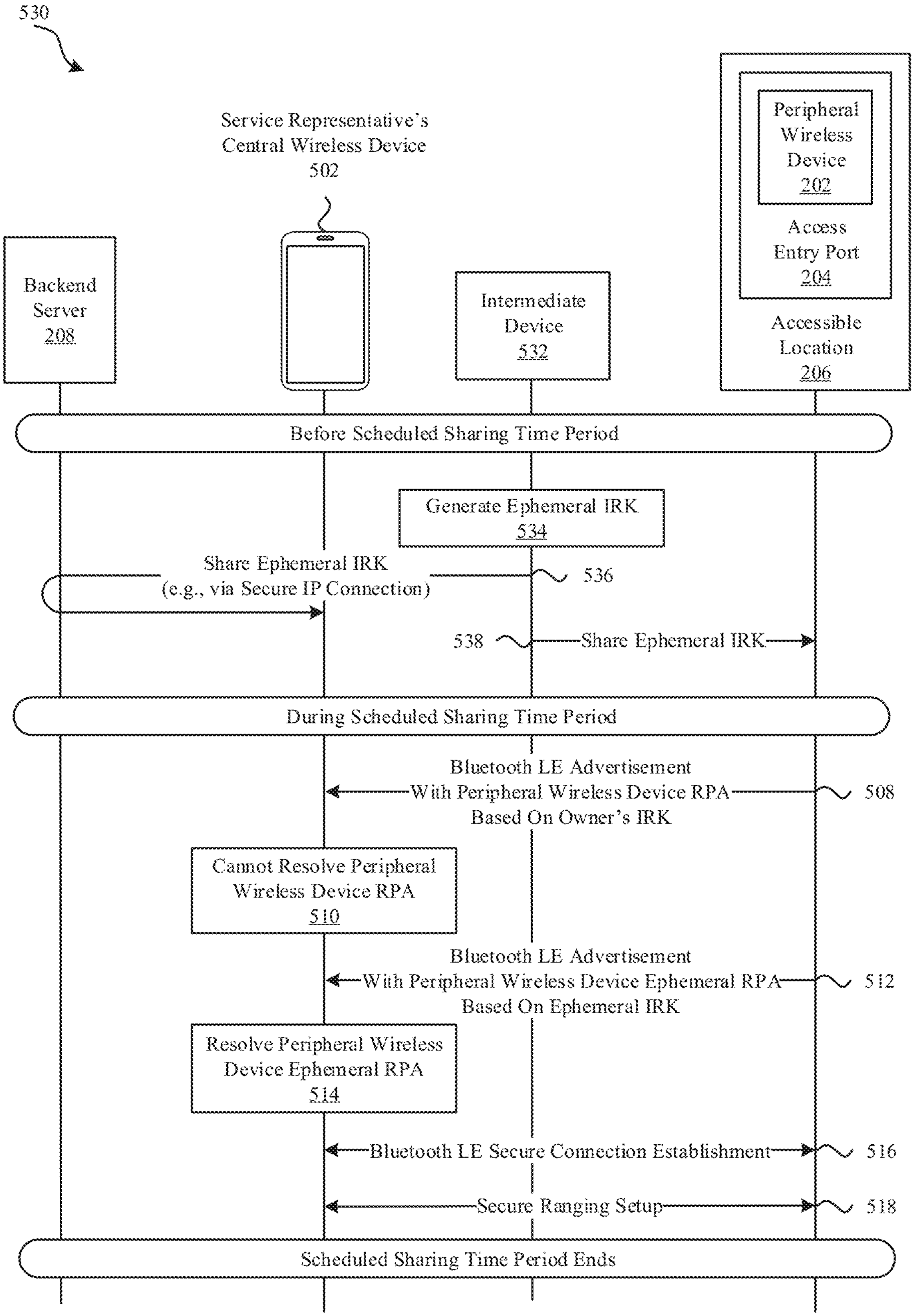

FIG. 5C illustrates a diagram 530 of a further exemplary sequence of messages for establishing a secure BLE connection between a service representative's central wireless device 502 and a peripheral wireless device 202 to grant access, e.g., to an accessible location 206, during a scheduled time period based on use of an ephemeral IRK. Before the scheduled sharing time period, during which access can be granted, at 534, an intermediate device 532 associated with the peripheral wireless device 202 can generate an ephemeral IRK. In some embodiments, the intermediate device 532 can be another wireless device 102 maintained by the owner of the peripheral wireless device 202, e.g., an owner's central wireless device 102. The intermediate device 532, at 536, can share the ephemeral IRK with the service representative's central wireless device 502, e.g., via a secure IP connection through the backend server 208. In some embodiments, the intermediate device 532 provides the ephemeral IRK to the backend server 208 at a first time, e.g., before the scheduled sharing time period, and the backend server 208 separately provides the ephemeral IRK to the service representative's central wireless device, e.g., before or during the scheduled time period. At 538, the intermediate device 532 shares the ephemeral IRK 522 with the peripheral wireless device 202 for use during the scheduled time period. In some embodiments, the intermediate device 532 provides the ephemeral IRK to the peripheral wireless device 202 and/or to the service representative's central wireless device 502 during the scheduled time period rather than before the scheduled time period. During the scheduled time period, the peripheral wireless device broadcasts one or more BLE advertisement messages that include an ephemeral RPA for the peripheral wireless device based on the ephemeral IRK provided by the backend server 208. As with FIGS. 5A and 5B, the service representative's central wireless device 502 can resolve the ephemeral RPA, establish a secure BLE connection, and complete a secure ranging operation to allow for obtaining access, e.g., to the accessible location 206, during the scheduled sharing time period. The actions involved and optional variations described for FIG. 5A also apply to FIG. 5C.

Figure 6:
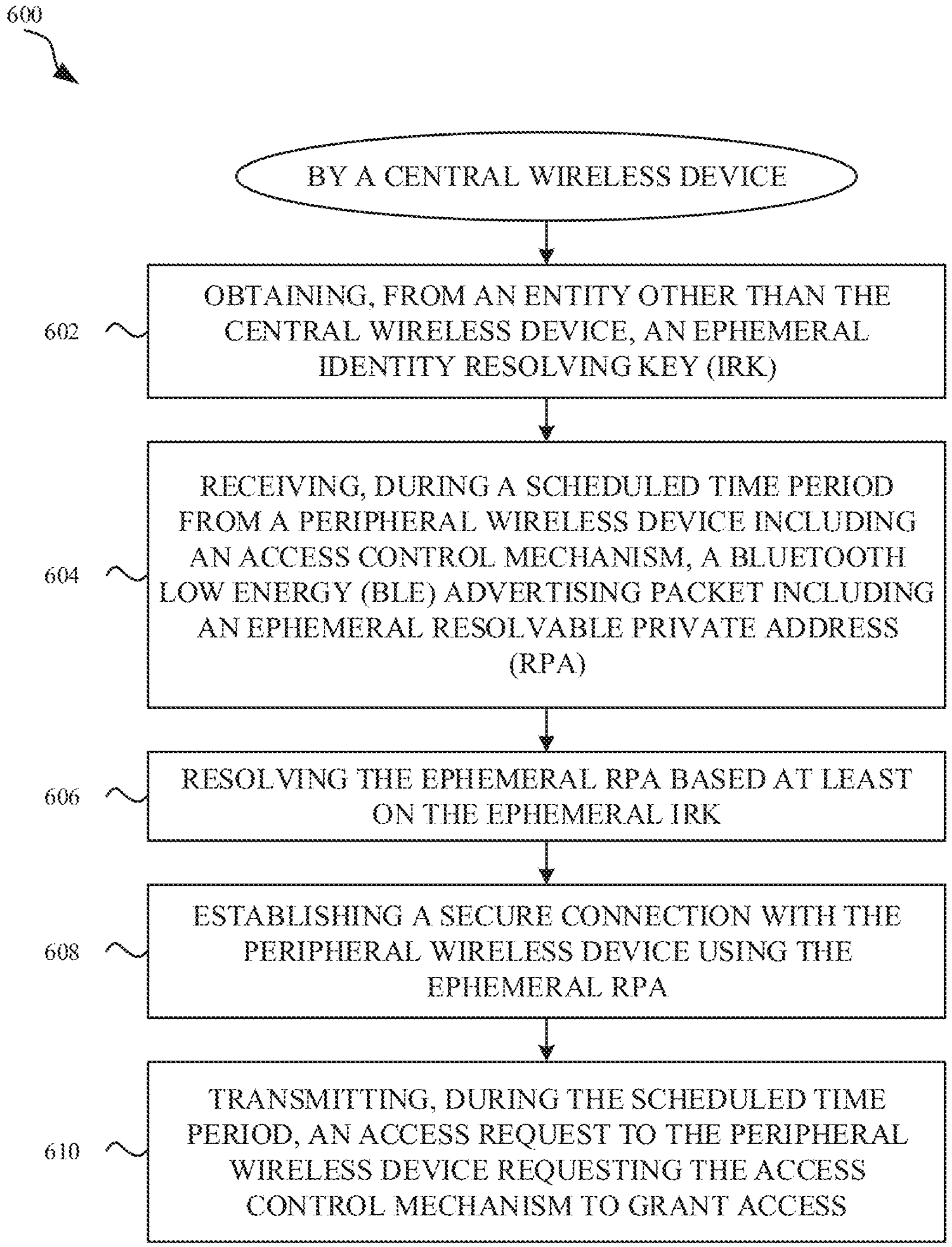
FIG. 6 illustrates an exemplary method performed by a central wireless device to obtain access using an ephemeral IRK, in accordance with some embodiments.

FIG. 6 illustrates a flowchart 600 of an exemplary method performed by a central wireless device 102 to obtain access, e.g., to an accessible location 206, using an ephemeral IRK. At 602, the central wireless device 102 obtains, from an entity other than the central wireless device 102, an ephemeral IRK. At 604, the central wireless device 102 receives, during a scheduled time period from a peripheral wireless device 202 that includes an access control mechanism, a Bluetooth Low Energy (BLE) advertising packet that includes an ephemeral resolvable private address (RPA). At 606, the central wireless device 102, resolves the ephemeral RPA based at least on the ephemeral IRK. At 608, the central wireless device 102 establishes a secure connection with the peripheral wireless device 202 based at least on the ephemeral RPA. At 610, the central wireless device 102 transmits, during the scheduled time period, an access request to the peripheral wireless device 202, requesting the access control mechanism to grant access, e.g., to the accessible location 206. In some embodiments, access is granted based on proximity of the central wireless device 102 to the peripheral wireless device 202 with or without transmission and/or reception of the access request.

In some embodiments, the ephemeral IRK is valid during the scheduled time period. In some embodiments, the ephemeral IRK is valid for a predetermined number of access control grants during the scheduled time period. In some embodiments, the predetermined number of access control grants permitted during the scheduled time period is one. In some embodiments, the ephemeral IRK becomes invalid after the peripheral wireless device grants access based on the ephemeral IRK. In some embodiments: i) the peripheral wireless device includes an electronic lock; ii) the access control mechanism is associated with the electronic lock; and iii) granting access includes configuring the electronic lock in an unlocked state. In some embodiments, the central wireless device 102 obtains the ephemeral IRK before the scheduled time period. In some embodiments, the central wireless device 102 obtains the ephemeral IRK during the scheduled time period. In some embodiments, the ephemeral IRK is generated by the peripheral wireless device 202 and is provided to the central wireless device 102 via an out-of-band communication. In some embodiments, the out-of-band communication includes a secure Internet Protocol (IP) connection to a network-based server associated with a scheduled service. In some embodiments, the ephemeral IRK is generated by a network-based server, e.g., backend server 208, associated with a scheduled service, and the network based server provides the ephemeral IRK to both the central wireless device 102 and the peripheral wireless device 202 via separate, secure out-of-band communications. In some embodiments, the ephemeral IRK is generated by an intermediate device 532 associated with the peripheral wireless device 202, and the intermediate device 532 provides the ephemeral IRK to both the central wireless device 102 and the peripheral wireless device 202 via separate, secure out-of-band communications. In some embodiments, the method further includes the central wireless device 102 receiving before the scheduled time period an updated ephemeral IRK and replacing the ephemeral IRK with the updated ephemeral IRK prior to resolving the ephemeral RPA.

In some embodiments, a method performed by a peripheral wireless device 202 for scheduled access controlled via an access control mechanism associated with the peripheral wireless device 202 includes: i) generating an ephemeral identity resolving key (IRK); ii) generating an ephemeral resolvable private address (RPA) based on the ephemeral IRK; iii) transmitting, during a predetermined time period, a Bluetooth Low Energy (BLE) advertising packet, where the BLE advertising packet includes the ephemeral RPA; and iv) in response to detecting successful resolution of the ephemeral RPA by a requesting wireless device 102: establishing a secure connection with the requesting wireless device 102, and granting access responsive to receipt of an access request from the requesting wireless device 102 during the predetermined time period.

In some embodiments, the ephemeral IRK is valid during the predetermined time period. In some embodiments, the ephemeral IRK is valid for a predetermined number of access control grants during the predetermined time period. In some embodiments, the ephemeral IRK becomes invalid after the peripheral wireless device 202 grants access based on the ephemeral IRK. In some embodiments, the peripheral wireless device 202 provides the ephemeral IRK to the requesting wireless device 102 via an out-of-band communication. In some embodiments, the out-of-band communication includes a secure Internet Protocol (IP) connection to a network-based server associated with a scheduled service.

In some embodiments, a wireless device 102 includes processing circuitry including one or more processors and a memory storing instructions that, when executed by the one or more processors, cause the wireless device 102 to perform actions that include: i) obtaining, from an entity other than the wireless device 102, an ephemeral identity resolving key (IRK); ii) receiving, during a scheduled time period from a second wireless device 202 that includes an access control mechanism, a Bluetooth Low Energy (BLE) advertising packet, where the BLE advertising packet includes an ephemeral resolvable private address (RPA); iii) resolving the ephemeral RPA based at least on the ephemeral IRK; iv) establishing a secure connection with the second wireless device 202 using the ephemeral RPA; and v) transmitting, during the scheduled time period, an access request to the second wireless device 202 requesting the access control mechanism to grant access, e.g., to an accessible location 206. In some embodiments, access is granted based on proximity of the wireless device 102 to the second wireless device 202 after successful secure BLE connection establishment and secure ranging.

Figure 7:
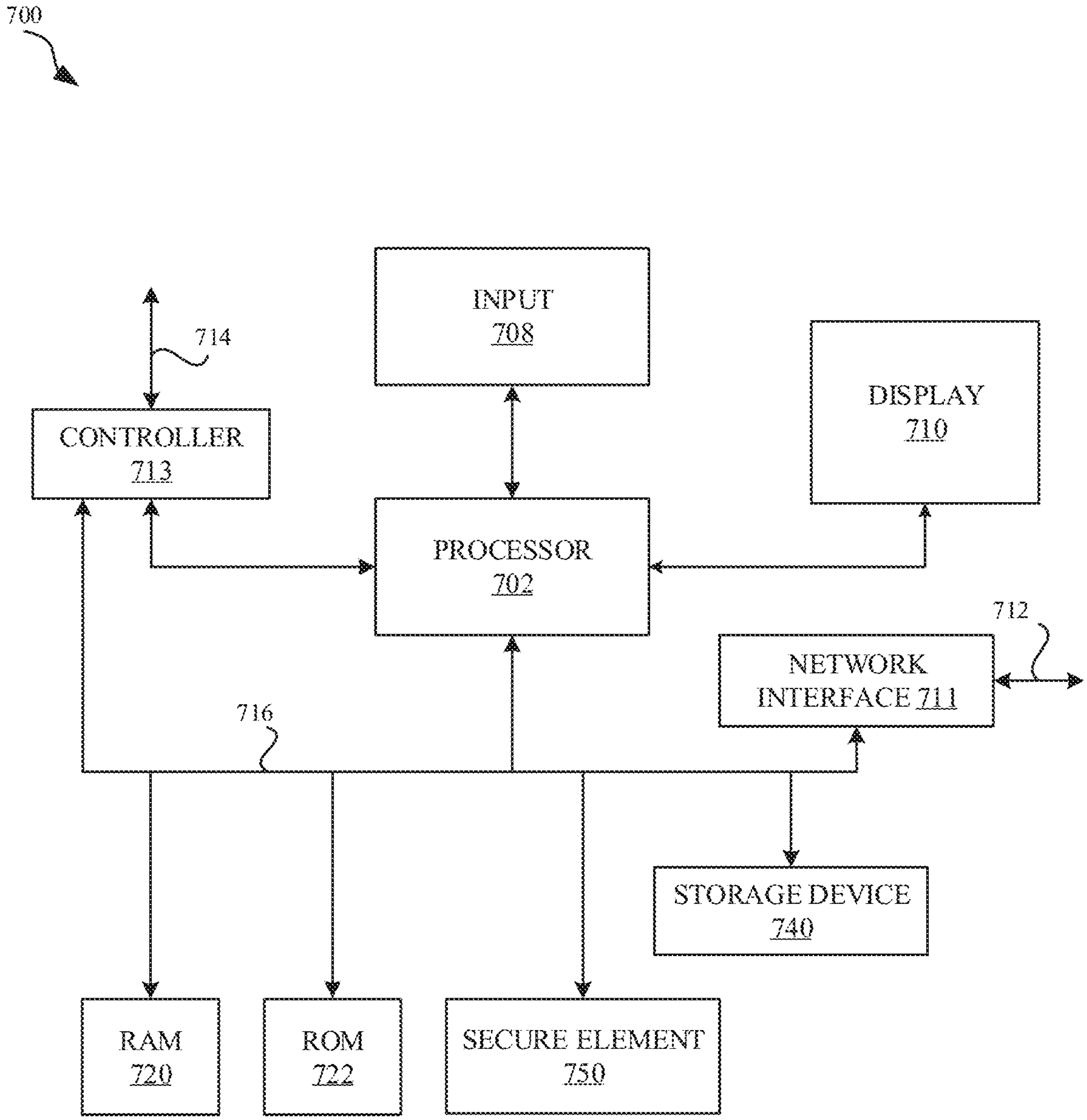
FIG. 7 illustrates an exemplary apparatus for implementation of embodiments disclosed herein, in accordance with some embodiments.

FIG. 7 illustrates a detailed view of a representative computing device 700 that can be used to implement various methods described herein, according to some embodiments. In particular, the detailed view illustrates various components that can be included in the wireless device 102. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 that can be controlled by the processor 702 to display information to the user. A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that communicatively couples to a data link 712. In the case of a wireless connection, the network/bus interface 711 can include a wireless transceiver.

The computing device 700 also includes a storage device 740, which can comprise a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700. The computing device 700 can further include a secure element (SE) 750, which can represent secure storage for cellular wireless access control clients, such as subscriber identity module (SIM) or electronic SIM, for use by the wireless device 102 to establish a WWAN 108 connection.

Wireless Terminology

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or fifth generation (5G) or other present or future next generation (NG) developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device can be configured to prefer attachment to LTE networks offering faster data rate throughput, as compared to other 3G legacy networks offering lower data rate throughputs. For instance, in some implementations, a multi-mode wireless device may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for scheduled access via an access control mechanism, the method comprising:
- by a first wireless device:
  - obtaining an ephemeral identity resolving key (IRK) that is valid only during a scheduled time period;
  - receiving, during the scheduled time period from a second wireless device that comprises the access control mechanism, an ephemeral resolvable private address (RPA) based on the ephemeral IRK;
  - deriving a Bluetooth address of the second wireless device using the ephemeral IRK and the ephemeral RPA; and
  - transmitting, during the scheduled time period and using the Bluetooth address, an access request to the second wireless device, requesting the access control mechanism to grant access.

2. The method of claim 1, wherein the ephemeral RPA is valid only during the scheduled time period.

3. The method of claim 1, wherein the first wireless device receives the RPA in a Bluetooth advertising packet broadcast by the second wireless device during the scheduled time period.

4. The method of claim 1, wherein the ephemeral IRK is valid for a predetermined number of access control grants during the scheduled time period.

5. The method of claim 4, wherein the predetermined number of access control grants permitted during the scheduled time period is one.

6. The method of claim 1, wherein the ephemeral IRK becomes invalid after the access control mechanism grants access based on the ephemeral IRK.

7. The method of claim 1, wherein:
- the second wireless device comprises an electronic lock;
- the access control mechanism is associated with the electronic lock; and
- granting access comprises configuring the electronic lock in an unlocked state.

8. The method of claim 1, wherein the first wireless device obtains the ephemeral IRK before the scheduled time period.

9. The method of claim 1, wherein the first wireless device obtains the ephemeral IRK from an entity other than the first wireless device.

10. The method of claim 1, wherein:
- the first wireless device receives the ephemeral IRK from the second wireless device via an out-of-band communication.

11. The method of claim 1, wherein:
- the first wireless device receives, via a secure out-of-band communication, the ephemeral IRK from a network-based server associated with a scheduled service.

12. The method of claim 1, further comprising:
- receiving, by the first wireless device, an updated ephemeral IRK, and
- replacing the ephemeral IRK with the updated ephemeral IRK prior to deriving the Bluetooth address of the second wireless device.

13. A method for scheduled access using an access control mechanism of a second wireless device, the method comprising:
- by the second wireless device:
  - transmitting, during a predetermined time period, a Bluetooth Low Energy (BLE) advertising packet comprising an ephemeral resolvable private address (RPA) based on an ephemeral identity resolving key (IRK), wherein the ephemeral IRK and the ephemeral RPA are valid only during the predetermined time period; and
  - in response to detecting successful resolution of the ephemeral RPA to derive a Bluetooth address of the second wireless device by a first wireless device:
    - establishing a secure connection with the first wireless device using the Bluetooth address, and
    - granting access responsive to receipt of an access request from the first wireless device during the predetermined time period.

14. The method of claim 13, wherein the ephemeral IRK is valid for a predetermined number of access control grants during the predetermined time period.

15. The method of claim 13, wherein the ephemeral IRK becomes invalid after the second wireless device grants access based on the ephemeral IRK.

16. The method of claim 13, wherein the second wireless device provides, via an out-of-band communication, the ephemeral IRK to the first wireless device.

17. A wireless device comprising:
- processing circuitry comprising one or more processors and a memory storing instructions that configure the wireless device to:
  - obtain an ephemeral identity resolving key (IRK) that is valid only during a scheduled time period;
  - receive, during the scheduled time period from a second wireless device that comprises an access control mechanism, an ephemeral resolvable private address (RPA) based on the ephemeral IRK;
  - deriving a Bluetooth address of the second wireless device using the ephemeral IRK and the ephemeral RPA; and
  - transmitting, during the scheduled time period and using the Bluetooth address, an access request to the second wireless device, requesting the access control mechanism to grant access.

18. The wireless device of claim 17, wherein the ephemeral RPA is valid only during the scheduled time period.

19. The wireless device of claim 17, wherein the ephemeral IRK is valid for a predetermined number of access control grants during the scheduled time period.

20. The wireless device of claim 17, wherein the ephemeral IRK becomes invalid after the access control mechanism grants access based on the ephemeral IRK.

* * * * *